United States Patent [19]
Kraft et al.

[11] Patent Number: 5,702,230
[45] Date of Patent: Dec. 30, 1997

[54] ACTIVELY CONTROLLED ACOUSTIC TREATMENT PANEL

[75] Inventors: Robert E. Kraft, Cincinnati; Asif A. Syed, Loveland, both of Ohio

[73] Assignee: General Electric Company, Cincinnati, Ohio

[21] Appl. No.: 603,850

[22] Filed: Jan. 29, 1996

[51] Int. Cl.$^6$ .................................................. F01D 25/04
[52] U.S. Cl. .................... 415/119; 181/206; 244/1 N; 381/71
[58] Field of Search .................... 415/118, 119; 181/206; 60/725; 310/322, 324, 334, 338; 340/388.1, 388.3; 381/71; 244/1 N

[56] References Cited

U.S. PATENT DOCUMENTS

| | | | |
|---|---|---|---|
| 4,421,811 | 12/1983 | Rose et al. | |
| 4,484,856 | 11/1984 | Patacca | 415/119 |
| 4,615,214 | 10/1986 | Burns | 310/338 |
| 4,715,559 | 12/1987 | Fuller | |
| 4,761,582 | 8/1988 | McKee | 310/324 |
| 4,815,139 | 3/1989 | Eriksson et al. | |
| 4,926,963 | 5/1990 | Snyder | |
| 4,967,550 | 11/1990 | Acton et al. | |
| 5,018,203 | 5/1991 | Sawyers et al. | |
| 5,024,288 | 6/1991 | Shepherd et al. | |
| 5,119,427 | 6/1992 | Hersh et al. | |
| 5,310,586 | 5/1994 | Mullen | |
| 5,315,661 | 5/1994 | Gossman et al. | |
| 5,370,340 | 12/1994 | Pla | |
| 5,371,801 | 12/1994 | Powers et al. | |
| 5,415,522 | 5/1995 | Pla et al. | |
| 5,423,658 | 6/1995 | Pla et al. | 415/119 |
| 5,498,127 | 3/1996 | Kraft et al. | 415/119 |

FOREIGN PATENT DOCUMENTS

| | | | |
|---|---|---|---|
| 553587 | 3/1993 | Japan | |
| 9409482 | 4/1994 | WIPO | 181/206 |

OTHER PUBLICATIONS

Kim, S.J. and Jones, J.D. "AIAA Journal", Optimal Design of Piezoactuators for Active Noise and Vibration Control, Dec. 1991, No. 12, pp. 2047–2053.

Kraft, R.E. and Motsinger, R.E. *Aeroacoustics of Flight Vehicles*, "Design and Performance of Duct Acoustic Treatment," Aug. 1991, vol. 2, pp. 165–206.

Lee, C., Chiang, W. and O'Sullivan, T., AIAA '89, "Piezoelectric Modal Sensors and Actuators Achieving Critical Active Damping on a Cantilever Plate", 1989, pp. 2018–2026.

Sirlin, S.W., "Piezoelectric Polymer–Based Isolation Mount for Articulated Pointing Systems on Large Flexible Spacecraft", 1987, pp. 1–24.

*Primary Examiner*—Christopher Verdier
*Attorney, Agent, or Firm*—Andrew C. Hess; Patrick R. Scanlon

[57] ABSTRACT

An actively controlled acoustic treatment panel for suppressing noise in a gas turbine engine nacelle including a backsheet formed by a planar matrix of adjacent individually controllable elements, where each of the controllable elements has a transducer and a honeycomb cell enclosing the transducer. A facesheet is also bonded to the controllable elements. A plurality of sensors are positioned within the acoustic treatment panel for sensing acoustic pressure of the noise propagated against the facesheet. A driver is provided for electrically driving each of the transducers to effect displacement thereof in a direction substantially perpendicular to the facesheet. Circuitry is also operatively connected to the pressure sensors and the driver for controlling velocity magnitude and phase of the transducers during displacement, wherein a resulting acoustic impedance at the facesheet achieves a desired acoustic impedance boundary condition at the nacelle. The transducer is further made up of an inner lamination layer, an outer lamination layer, and a piezoelectric membrane positioned between the inner and outer lamination layers, wherein a plurality of aligned openings are provided in the inner and outer lamination layers so that the piezoelectric membrane can be displaced either toward or away from the facesheet.

12 Claims, 2 Drawing Sheets

ACTIVELY CONTROLLED ACOUSTIC TREATMENT PANEL

BACKGROUND OF THE INVENTION

1. Field of the Invention

The present invention relates generally to acoustic treatment for suppressing radiated noise in an aircraft engine nacelle and, more specifically, to an acoustic treatment panel for an aircraft engine nacelle in which its acoustic impedance can be actively controlled as engine operating conditions are varied.

2. Description of the Related Art

Acoustic treatment that lines the ducts of aircraft engines is the most common way of suppressing aircraft engine noise beyond those levels incorporated into the original design of the turbomachinery, and accounts for a large percentage of the overall noise reduction built into the engine's nacelle design. One type of acoustic treatment works by absorbing the acoustic sound waves that impinge on the treatment inside the duct and reducing the level of the sound waves radiating from the duct terminations. It will be understood that the key design parameter for this type of acoustic treatment is the acoustic impedance, or ratio of acoustic dynamic pressure to acoustic velocity, obtained at the surface of the treatment panel. Conventional acoustic treatment works in a passive manner, where the acoustic impedance at any given frequency is obtained as a result of the particular configuration of the passive resistive and reactive elements incorporated into the mechanical design of the acoustic treatment panel. Such a passive design, which normally takes the form of one or more honeycomb layers of specified depth, is limited by the mechanical lumped resistive and reactive properties of those elements which make up the structure.

These disadvantages were recognized in U.S. Pat. No. 5,498,127, entitled "Active Acoustic Liner," which is also owned by the assignee of the present invention and is hereby incorporated by reference. In that design, a first portion of the liner was of the conventional passive type and a second portion downstream therefrom was of an active type. More specifically, the active liner in this other patent application included a rigid backplate supporting a piezoelectric panel, a pressure transducer disposed in the panel for sensing acoustic pressure of the noise being propagated against a face surface of the panel, and a controller having a predetermined schedule of acoustic impedance for controlling a displacement driver joined to the panel. In this way, a velocity of the panel face surface is effected for obtaining a predetermined acoustic impedance at the sensed acoustic pressure for attenuating noise. However, it will be seen that the transducer in this design is located immediately adjacent the facesheet within the duct. Therefore, while the active liner of the aforementioned patent application is able to function according to its intended purpose, where the frequency range of noise being attenuated is larger than for conventional acoustic treatment, such active liner does not include any passive damping or provide any protection to the transducer. Further, since the acoustic treatment described therein involves separate passive and active portions, manufacturing and implementation thereof within an aircraft engine nacelle is more complicated.

Other active noise control systems are known for injecting acoustic energy with suitable power to cancel pressure waves being generated by the noise source. These systems are also referred to as anti-noise systems since they generate opposite phase noise for canceling the source noise. However, these systems are relatively complex, requiring microphones at the listening location and loud speakers for generating the anti-noise, and vary widely in effectiveness.

Accordingly, it would be desirable for an acoustic treatment for an aircraft engine nacelle to be developed which covers a frequency range larger than conventional acoustic treatments. It would also be desirable if such an acoustic treatment could be actively adapted to changing acoustic environments as engine operating conditions are varied.

SUMMARY OF THE INVENTION

An actively controlled acoustic treatment panel for suppressing noise in a gas turbine engine nacelle is disclosed as including a backsheet formed by a planar matrix of adjacent individually controllable elements, where each of the controllable elements has a transducer and a honeycomb cell enclosing the transducer. A facesheet is also bonded to the controllable elements. A plurality of sensors are positioned within the acoustic treatment panel for sensing acoustic pressure of the noise propagated against the facesheet. Means are provided for electrically driving each of the transducers to effect displacement thereof in a direction substantially perpendicular to the facesheet. Means are also operatively connected to the pressure sensors and the driving means for controlling velocity magnitude and phase of the transducers during displacement, wherein a resulting acoustic impedance at the facesheet achieves a desired acoustic impedance boundary condition at the nacelle. The transducer is further made up of an inner lamination layer, an outer lamination layer, and a piezoelectric membrane positioned between the inner and outer lamination layers, wherein a plurality of aligned openings are provided in the inner and outer lamination layers so that the piezoelectric membrane can be displaced either toward or away from the facesheet.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF THE INVENTION

Figure 1:
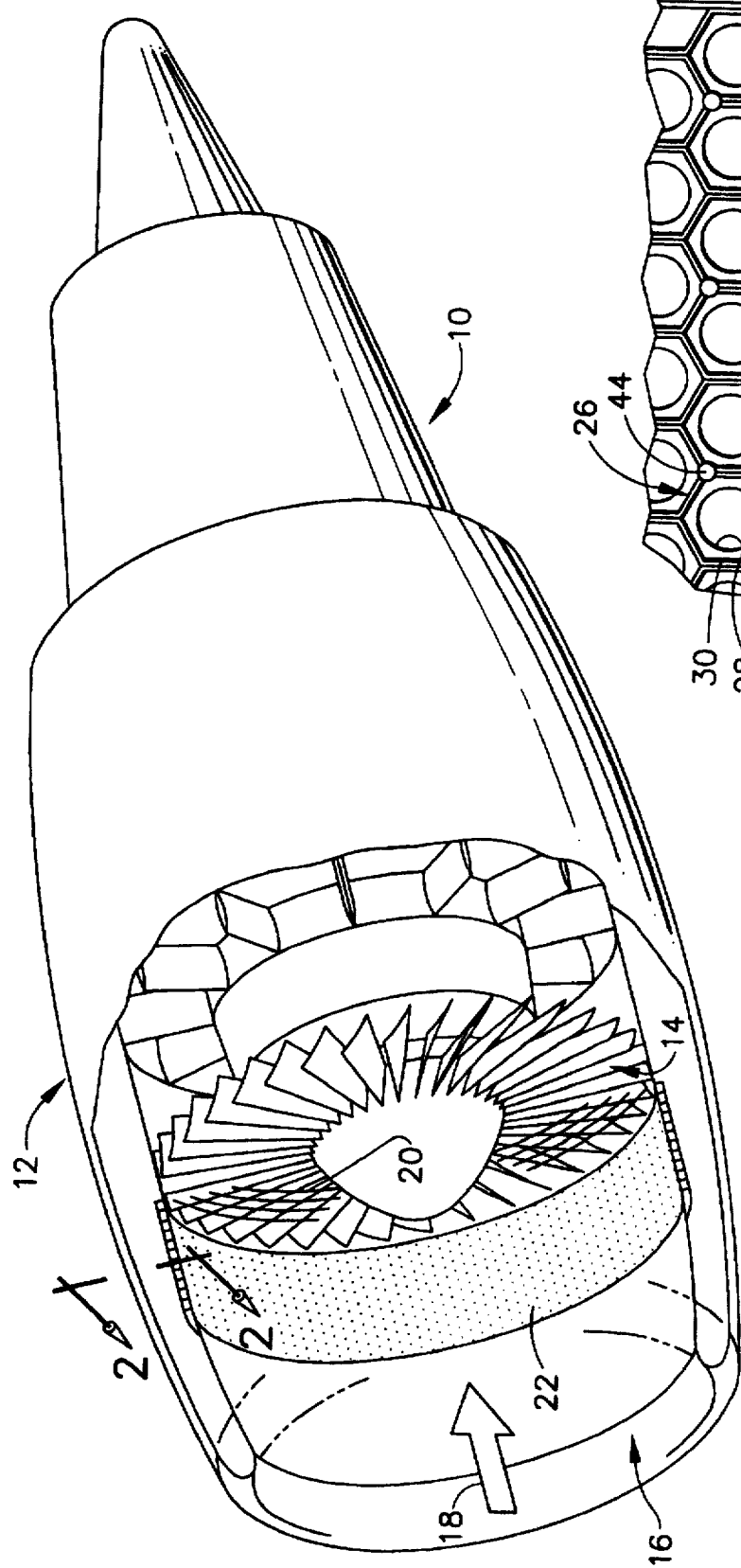
FIG. 1 is a perspective view of an exemplary turbofan aircraft gas turbine engine, wherein a portion has been broken away to show a nacelle having an active acoustic treatment panel of the present invention disposed upstream of a fan for attenuating noise therein.

Referring now to the drawings in detail, wherein identical numerals indicate the same elements throughout the figures, FIG. 1 depicts an exemplary turbofan gas turbine engine 10 configured for powering an aircraft (not shown) in flight. Engine 10 may conventionally be supported from the aircraft wing or tail as desired. In particular, engine 10 includes a conventional nacelle 12 surrounding a conventional fan 14 which includes a plurality of circumferentially spaced fan blades powered by a power turbine (not shown) disposed downstream in engine 10. Nacelle 12 includes an inlet duct 16 which receives ambient air 18 that flows downstream through fan 14 along an axial centerline axis of engine 10.

During operation of fan 14, especially during takeoff of the aircraft when the blades of fan 14 reach transonic and supersonic velocities, noise 20 is generated therefrom and propagated upstream and out inlet duct 16. In order to attenuate noise 20 radiated within nacelle 12, an acoustic treatment panel (generally indicated by the numeral 22) is disposed upstream of fan 14 in accordance with the present invention. Acoustic treatment panel 22 is configured for attenuating noise over a relatively wide frequency range, preferable from 800 to 8,000 Hertz.

Figure 2:
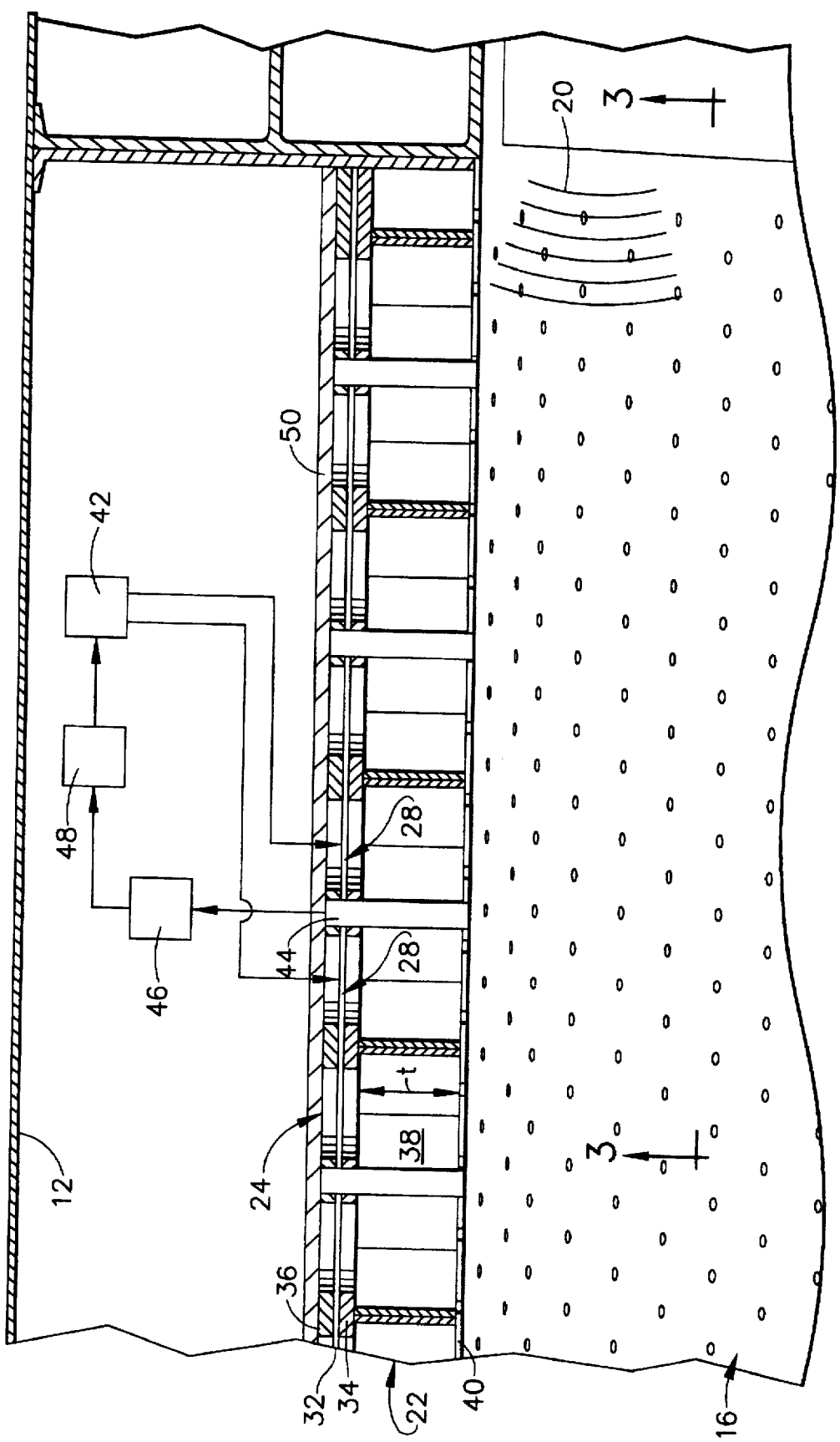
FIG. 2 is a schematic representation of the active acoustic treatment panel depicted in FIG. 1 taken generally along line 2—2 therein.

More specifically, FIG. 2 illustrates schematically a portion of acoustic treatment panel 22 positioned upstream of fan 14 within inlet duct 16. It will be seen that acoustic treatment panel 22 includes a backsheet 24 formed by a circumferential matrix of adjacent individually controllable elements 26 (see FIG. 3). Each individually controllable element 26 is made up of a transducer 28 and a honeycomb cell 30 enclosing transducer 28. Transducer 28 may be any type known in the art, such as a microphone or the like, but preferably involves a piezoelectric membrane 32 positioned between an inner lamination layer 34 and an outer lamination layer 36. It will be seen in FIGS. 2 and 3 that inner and outer lamination layers 34 and 36 each have a plurality of openings formed therein which are aligned so that piezoelectric membrane 32 can be displaced in either direction.

Figure 3:
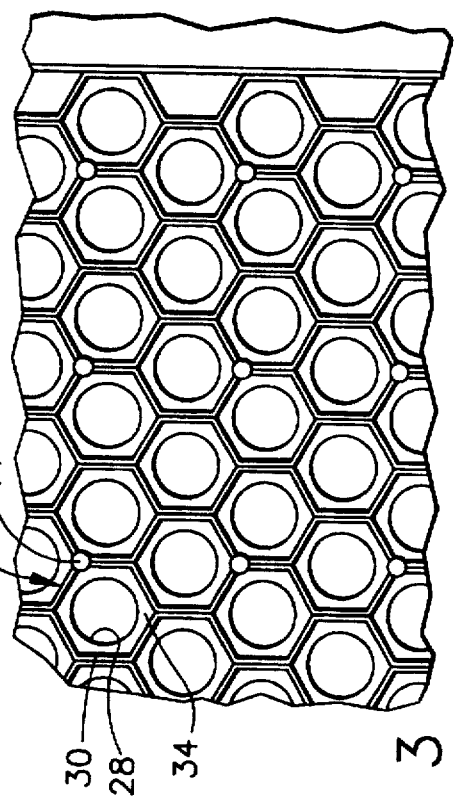
FIG. 3 is a partial schematic representation of the active acoustic treatment panel depicted in FIGS. 1 and 2 taken along line 3—3 in FIG. 2.

It will be understood that acoustic treatment panel 22 includes a plurality of individually controllable elements 26 positioned adjacent each other, with honeycomb cells 30 forming the boundaries of each element 26. While honeycomb cells 30 are depicted in FIG. 3 as having a hexagonal shape, they could just as easily be rectangular, circular, or some other design. In any event, honeycomb cells 30 are configured so that transducers 28 are not interfered with or restricted from being displaced. Each honeycomb cell 30 has a thickness t, which in turn forms a reactive cavity 38 therein. While the honeycomb cell thickness is determined for each particular application, it preferably is between ½ and 1 inch.

A facesheet 40 is bonded to the end of honeycomb cell 30 opposite transducers 28. As seen in FIG. 2, facesheet 40 is perforated and supplies a measure of passive damping of noise 20 in inlet duct 16, thereby reducing the workload of transducers 28. Facesheet 40 and backsheet 24 are then preferably assembled into a continuous ring, which is mounted circumferentially around inlet duct 16.

Means in the form of a conventional electrical displacement driver 42 are electrically joined to piezoelectric membrane 32 for driving it with a suitable voltage to effect piezoelectric displacement thereof in a direction substantially perpendicular to facesheet 40. It will be noted that piezoelectric membrane 32 may be displaced either radially inwardly or radially outwardly in light of the openings in inner lamination layer 34 and outer lamination layer 36, respectively. Accordingly, acoustic treatment panel 22 may have either a positive (toward facesheet 40) resistance or a negative (away from facesheet 40) resistance. Piezoelectric membrane 32 may be formed of any suitable piezoelectric material, such as lead zirconium titanate (PZT) or polyvinylidene fluoride (PVDF), which upon application of a voltage thereto effects mechanical strain to change its thickness and correspondingly displaces membrane 32 relative to a position centrally located between inner and outer lamination layers 34 and 36. By suitably driving or exciting piezoelectric membrane 32, the thickness of acoustic treatment panel 22 may expand and contract to predeterminedly control the velocity thereof.

A plurality of sensors 44 are positioned within acoustic treatment panel 22 for sensing acoustic pressure of noise 20 propagated against facesheet 40. Sensors 40 (e.g., Kulite sensors) are positioned at periodic intervals and mounted flush to facesheet 40. The spacing of sensors 44, as best seen in FIG. 3, will depend on acoustic wavelengths at the highest desired frequency of operation. Of course, it will be noted that each sensor 44 will preferably be positioned at the intersection of adjacent honeycomb cells 30.

Means 46 preferably is provided for acquiring and processing the spectral data information obtained by each sensor 44. In this way, the local pressure field adjacent each sensor 44 can be determined so that acoustic treatment panel 22 can be adapted accordingly. The acoustic impedance provided by each transducer 28 can then be adapted across acoustic treatment panel 22 to meet the needs of the given area. Therefore, the acoustic impedance provided by acoustic treatment panel 22 may be substantially constant thereacross or it may be varied both circumferentially and axially.

Control means 48 are operatively connected to spectral data acquisition/processing means 46 and electrical displacement driver 42 for controlling velocity magnitude and phase of transducers 28 during displacement, wherein a resulting acoustic impedance at facesheet 40 achieves a desired acoustic impedance boundary condition within inlet duct 16.

A rigid backplate 50 in the form of a suitably thick metal or composite plate may be provided behind backsheet 24 for structural rigidity of acoustic treatment panel 22.

As stated above, acoustic treatment panel 22 is not limited to the use of positive resistance valves (like passive liners of the prior art) to absorb energy. Therefore, acoustic treatment panel 22 may not only provide positive resistance and negative reactance, but also negative resistance as an alternative. Such negative resistance may be provided through the appropriate phasing of the vibration of piezoelectric membrane 32, and can be useful to provide a particularly high mode scattering effect.

Having shown and described the preferred embodiment of the present invention, further adaptations of the acoustic treatment panel can be accomplished by appropriate modifications by one of ordinary skill in the art without departing from the scope of the invention.

What is claimed is:

1. An actively controlled acoustic treatment panel for suppressing noise in a gas turbine engine nacelle, comprising:
    (a) a piezoelectric membrane;
    (b) a plurality of interconnected honeycomb members having a first end positioned adjacent a radially inner surface of said piezoelectric membrane and a second end spaced from said first end to form a cavity between said piezoelectric membrane and said second honeycomb member end, wherein a circumferential matrix of adjacent individually controllable elements is formed within the boundary of each honeycomb member;
    (c) a facesheet bonded to said second end of said interconnected honeycomb members;
    (d) a plurality of sensors positioned within said acoustic treatment panel for sensing acoustic pressure of said noise propagated against said facesheet;
    (e) means for electrically driving each of said individually controllable elements to effect displacement in a direction substantially perpendicular to said facesheet; and (f) means operatively connected to said pressure sensors and said driving means for controlling velocity magnitude and phase of said individually controllable elements during displacement, wherein a resulting acoustic impedance at said facesheet achieves a desired acoustic impedance boundary condition at said nacelle.

2. The actively controlled acoustic treatment panel of claim 1, wherein each said honeycomb member is substantially hexagonal.

3. The actively controlled acoustic treatment panel of claim 1, further comprising a rigid backplate positioned adjacent a radially outer surface of said piezoelectric membrane.

4. The actively controlled acoustic treatment panel of claim 1, further comprising means for acquiring and processing spectral data from said pressure sensors.

5. The actively controlled acoustic treatment panel of claim 1, wherein said interconnected honeycomb members and said facesheet are assembled into a continuous ring and mounted circumferentially around said nacelle.

6. The actively controlled acoustic treatment panel of claim 1, further comprising:

(a) a first lamination layer positioned adjacent said inner radial surface of said piezoelectric membrane; and (b) a second lamination layer positioned adjacent an outer radial surface of said piezoelectric membrane;

wherein a plurality of aligned openings are provided in said first and second lamination layers so that said piezoelectric membrane can be displaced either toward or away from said facesheet.

7. The actively controlled acoustic treatment panel of claim 1, wherein said acoustic impedance includes positive resistance and negative reactance.

8. The actively controlled acoustic treatment panel of claim 1, wherein said acoustic impedance includes negative resistance.

9. The actively controlled acoustic treatment panel of claim 1, wherein said acoustic impedance is substantially constant circumferentially across said treatment panel.

10. The actively controlled acoustic treatment panel of claim 1, wherein said acoustic impedance is varied circumferentially across said treatment panel.

11. The actively controlled acoustic treatment panel of claim 1, wherein said acoustic impedance is provided adaptively across said treatment panel in response to locally sensed pressure fields by said sensors.

12. The actively controlled acoustic treatment panel of claim 1, wherein said treatment panel is able to suppress said noise in a frequency range of approximately 800 to approximately 8,000 Hertz.

* * * * *